INVENTOR.
JAMES A. NELSON
HIS ATTORNEY

United States Patent Office 3,529,698
Patented Sept. 22, 1970

3,529,698
SELF-OPERATING LUBRICATION SYSTEM FOR GEAR DRIVE UNITS
James A. Nelson, Erie, Pa., assignor to General Electric Company, a corporation of New York
Filed May 5, 1967, Ser. No. 636,363
Int. Cl. B61f 17/02; F16n 7/26
U.S. Cl. 184—6                                       6 Claims

ABSTRACT OF THE DISCLOSURE

A lubrication system for a gear drive unit wherein lubricant is delivered by gravity from a storage reservoir to selected locations to be lubricated and wherein the reservoir is supplied with lubricant by splash action of a main gear rotating through a channel-like baffle means located in the bottom of the housing of the gear unit and provided with a passage transversely therethrough to deposit lubricant on the inside rim surface of the main gear. The system also utilizes lubricant directing scoops to direct the splashed lubricant into the reservoir for both directions of rotation of the main gear.

---

This invention relates to gear drive units and, more particularly, to a self-operating lubrication system therefor. While the lubrication system of this invention may be used to advantage with a wide variety of gear units, it is especially useful for use in rail vehicle axle drive units of the type wherein a gear housing surrounds the rail vehicle axle and contains suitable gearing through which driving power is applied to the axle from a prime mover, such as an electric traction motor, and the invention will be particularly described in that connection.

Axle drive units for modern rail vehicles must be capable of transmitting high torque at very high speeds so that there has been an existing problem in providing proper lubrication to the gears and bearings. Moreover, unlike gear units for many applications, an equal supply of lubricant is required regardless of the direction of rotation of the gears since rail vehicles are operated in both the forward and reverse direction at these high operating speeds for long periods of time.

The usual type of rail vehicle axle drive includes a ring gear suitably press fit or otherwise drivingly secured to a quill shaft which is, in turn, drivingly secured to the vehicle axle; the ring gear being driven by a pinion gear. The gearing is enclosed within a suitable gear case which is provided with a sump to retain a supply of lubricant and lubrication for the gears and bearings is usually provided by the splashing action caused by rotation of the ring gear.

At higher vehicle speeds, such as the speeds required for modern rail vehicles, the splash-type system fails to provide adequate lubrication for the unit. Also, a force-feed system is not a satisfactory solution for a number of reasons including increased cost and complexity. Prior art attempts to provide a self-lubricating system by employing scoops or scrapers suitably located to pick up lubricant splashed off by the ring gear and deliver the lubricant as picked up to the various points to be lubricated have likewise not been entirely satisfactory in that the amount of lubricant available to be picked up in this manner varies so widely with speed and direction of rotation of the ring gear as well as with the operating level of the lubricant level in the sump. Thus, for example, the amount of lubricant picked up by the rotating ring gear decreases sharply as the oil level is reduced.

It is an object of this invention, therefore, to provide a lubrication system for a gear drive unit which overcomes one or more of the piror art difficulties which is simple, effective and reliable.

It is another object of this invention to proivde a new and improved self-operating lubrication system for a gear drive unit which provides for essentially a steady supply of lubricant to various locations of the unit independent of wide variations in the speed and direction of rotation of the gears and the operating level of the lubricant in the gear housing.

It is a further object of the invention to provide a gear drive unit which is more efficient than those known heretofore and which significantly reduces the possibility of lubricant leakage around the seals.

Briefly stated, in accordance with one aspect of the invention, a new and improved self-operating lubrication system is provided for a gear unit having a housing with a lubricant retaining sump and a gear rotatably mounted within the housing. A lubricant storage reservoir is arranged within the housing above the sump and adjacent the gear and is provided with means for directing lubricant from the gear into the reservoir. The reservoir is provided with one or more outlet means which direct the lubricant from the reservoir supply to the various different locations in the unit which are desired to be lubricated. This may be provided by different spouts leading directly to the different locations or by different openings which supply lubricant to different channels or passages constructed within the gear housing itself and which channels or passages then lead to the different locations.

The novel features believed characteristic of the invention are set forth with particularity in the appended claims. The invention itself, however, together wtih its organization and method of operation as well as further objects and advantages thereof may best be understood by reference to the following description taken in connection with the accompanying drawing in which:

Figure 1:
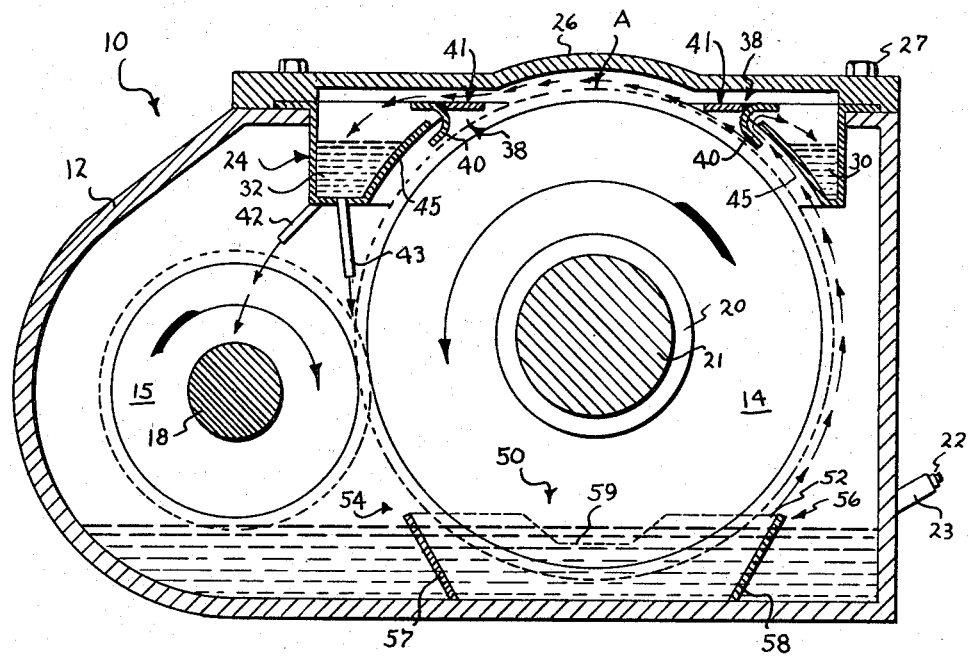
FIG. 1 is a vertical section view of a typical gear drive unit showing the present invention incorporated therein.
Figure 2:
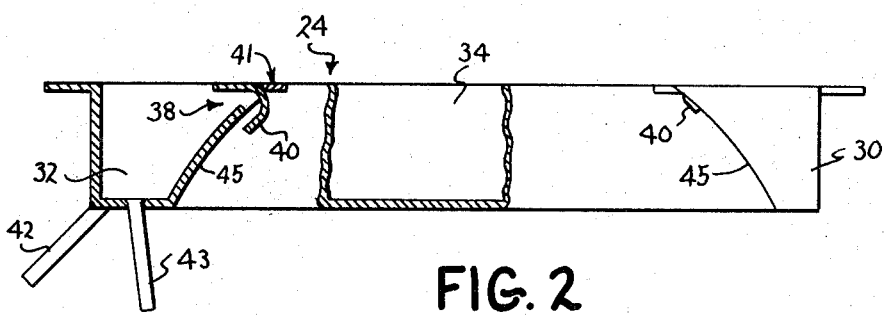
FIG. 2 is a plan view, partly in section, showing the lubricant retaining reservoir in more detail; and, FIG. 3 is a top view of the lubricant retaining reservoir.
Figure 3:
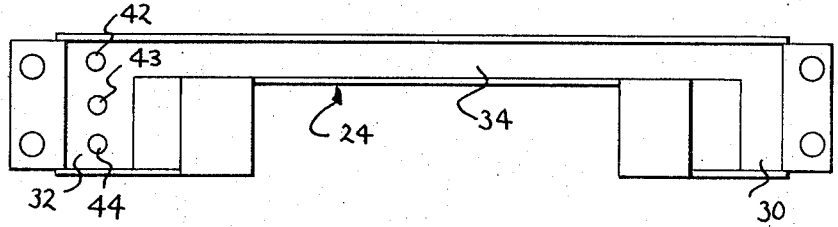

Referring now to FIG. 1, an axle drive unit for a rail vehicle is generally designated at 10 and includes a housing 12 in which a constantly meshing main or ring gear 14 and a pinion gear 15 are rotatably mounted. Pinion gear 15 is drivingly secured to a shaft 18 rotatably mounted on suitable bearings disposed in opposed side walls (not shown) of housing 12. Driving power from a prime mover, such as an electric traction motor, is coupled to the shaft 18. The ring gear 14 is press fit or otherwise drivingly secured to a quill shaft 20 which is rotatably mounted on suitable bearings disposed in the opposed side walls of the housing 12. As is well known in axle drive units, the quill shaft 20 is thereafter suitably press fit or otherwise drivingly secured to the axle 21 of the vehicle so that the driving power from the prime mover is transmitted through the meshing ring and pinion gear to the vehicle axle.

Lubricant is maintained in the bottom portion, or sump, of the housing usually at a level below that of the shaft seals; the sump being filled through a suitable access plug 22 threadedly received in a suitable nipple 23 which is in turn threadedly received in a wall of housing 12. To achieve the desired level of lubricant in the housing, it is the usual practice to fill the housing until lubricant overflows the nipple. As will become evident from the description which follows, this level will be somewhat higher than the level of lubricant when the gearing is in operation because of the amount of lubricant stored in the reservoir. This latter level, therefore, will be referred to hereinafter as the "operating level."

It will be evident that the foregoing description of the gear drive unit is general in nature and omits many specific details and elements which would be present in most gear drive units. For example, although only a single reduction unit has been illustrated, it will be understood that with the appropriate additional gearing, a multiple reduction unit may be provided. Also, elements such as seals, bearings and the like have not been shown or described. Since the gear drive unit itself may be of any suitable or conventional construction, the specific details of which are well known to those in the art, only such detail has been provided by the foregoing description as is believed useful in understanding the invention and its operation.

In accordance with this invention, the gear drive unit is provided with a new and improved self-operating lubrication system which provides a relatively steady flow of lubricant to various desired locations, such as for example, the bearings, gear meshing points and the like, independent of wide variations in the speed and direction of rotation of the gearing and in the operating level of the lubricant in the sump.

To this end, a lubricant storage reservoir 24 is arranged adjacent the upper portion of ring gear 14 and suitably secured within the housing 12. As shown, reservoir 24 fits about ring gear 14 at the top of the housing 12 and is secured between the walls of the housing and a top cover 26 which is secured to the housing walls by a plurality of bolts 27. Reservoir 24 terminates at one end in an enlarged portion or tank 30 and at the other end in an enlarged portion or tank 32. The enlarged portions 30 and 32 are located on opposite sides of the vertical center line of ring gear 14 and are interconnected by a channel means 34. The reservoir extends transversely to the longitudinal axis of the ring gear.

The reservoir 24 may be provided in various different configurations depending upon the organization and construction of the gear drive unit so long as it is arranged about the ring gear 14 in such a manner that lubricant will be supplied thereto by the action of the ring gear 14 and regardless of the direction of rotation of such gear. Thus, as shown in the drawing, reservoir 24 fits about ring gear 14 with an enlarged portion on each side thereof for collecting the lubricant carried and thrown off by the rotating gear. The reservoir has first and second internal wall portions 45 arranged adjacent to the periphery of the main gear and located, respectively, on opposite sides of the vertical center line of the main gear. Also, although shown as located at the top of the housing and ring gear, for some applications the reservoir may be suitably located at another location within the upper 180° quadrant defined by 90° angles on either side of the top of the main gear. For example, 90° on either side of the point identified by the letter A. The reservoir must be arranged to be higher than the highest point to be lubricated however.

Each of the enlarged portions 30 and 32 is provided with a lubricant directing or deflecting means 38 appropriately shaped to a configuration effective to direct lubricant to the reservoir. As shown, each directing means includes an arcuate portion 40 which functions (depending on the direction of rotation of ring gear 14) to collect lubricant thrown from the ring gear and direct it into the enlarged portion 30 or 32 with which it is associated. For example, for the counter-clockwise direction of rotation indicated, lubricant lifted and thrown off ring gear 14 is directed by the arcuate portion 40 of lubricant directing means 38 into the enlarged portion 30 as shown by the arrows. Also, lubricant is thrown from the top of ring gear 14 directly into the other enlarged portion 32. A second portion 41 of the lubricant deflecting means comprises a member secured to the arcuate first portion and extending substantially horizontally toward the periphery of the main gear. For the other direction of rotation, lubricant is directed by arcuate portion 40 into the enlarged portion 32 and thrown from the top of the gear directly into the enlarged portion 30.

In many applications, such as in rapid transit vehicles which do not operate at low speeds for any significant period of time but come up to operating speed quickly, lubricant need merely be directed by the arcuate portions 40 of the lubricant directing means 30 so that such portions need not actually remove lubricant from the gear but rather need only collect and direct lubricant which has been thrown off. Where the gear drive unit is to be operated at slow speeds for extended periods, such as in locomotive applications, the arcuate portions 40 are positioned in close proximity to the peripheral surface of the ring gear and function then as a combined scraper and directing means.

One of the enlarged portions, shown as enlarged portion 32, is provided with outlet means operative to meter lubricant from reservoir 24 and direct it to the various different locations in the gear unit where lubricant is desired. For example, reservoir 24 may be provided with a plurality of spouts, only three of which are illustrated at 42, 43 and 44, which lead from the reservoir to the locations to be supplied with lubricant, such as the gear meshing points and bearings for example.

In FIG. 1, the outlet means for delivering lubricant to the desired locations have been shown for convenience as spouts 42 and 43 leading from the reservoir directly to the locations to be lubricated. It will be understood, however, taht various arrangements may be employed to deliver the lubricant from the reservoir to the desired locations. For example, suitable channels or passages may be provided within the housing itself which lead to the various different locations to be lubricated and which channels or passages are supplied with lubricant from different outlets in reservoir 24.

Preferably, the gear unit is provided with a baffle means 50 which is carried by the bottom of the housing 12 and forms a channel within which ring gear 14 rotates. As shown, baffle means 50 includes opposed side walls, only one of which is shown at 52, which extend circumferentially from below the operating level of the lubricant in directions both clockwise and counter-clockwise and terminate in the respective ends 54 and 56 above the operating level of the lubricant. The opposed side walls are connected at the ends 54 and 56 by respective end walls 57 and 58 which extend from below the level of the lubricant to, preferably, the level of the side walls so as to provide a channel which surrounds the lower portion of the ring gear 14.

Preferably, lubricant is deposited on the inside rim or web of the ring gear 14 and this is conveniently achieved by providing baffle means 50 with a passage 59 extending laterally therethrough below the operating level of the lubricant. Lubricant thus flows laterally from the sump and is deposited on the inside rim surface of the ring gear as desired.

In operation, lubricant is supplied to the lubricant storage reservoir 24 by the action of the ring gear 14 as it rotates through the channel provided by baffle means 50 provided in the bottom of housing 12. Some of the lubricant is thrown from the gear teeth directly into the reservoir and some lubricant is directed thereto by the lubricant directing means 38. The lubricant so collected in reservoir 24 is fed out, by gravity, to the various different points to be lubricated by suitable outlet means.

The level of lubricant in reservoir 24 remains essentially constant regardless of the speed or direction of the gear or the operating level of the lubricant so that the points to be lubricated are supplied with a relatively constant flow of lubricant. For example, a considerable amount of lubricant is maintained in storage reservoir 24 during operation and as the amount of lubricant supplied by the ring gear decreases due to higher rotational speed, the level of lubricant in reservoir 24 decreases which in turn raises the level of lubricant in the sump. Since the amount of lubricant lifted, or pumped, by ring gear 14 increases with an increase in the level of lubricant in the sump, the lubricant in the reservoir is replenished so that an essentially constant level is maintained therein. Accordingly, an essentially constant flow of lubricant is fed from the reservoir to the selected points to be lubricated.

Also, because of the lubricant stored in reservoir 24 during operation of the unit, the operating level of the lubricant is lower than is the case in conventional gear units. This provides several advantages among which is a reduction in the temperature of the lubricant in the sump since there is less churning of lubricant by the gear, a reduction in the amount of splashing within the housing with a resulting reduction in the tendency of leakage of lubricant around the shaft seals and a reduction in the losses occasioned by the rotation of the gear through the lubricant in the sump to thereby improve the efficiency of the drive unit.

There has been described a novel self-operating lubrication system for a gear unit which has the extreme simplicity of a splash type system and the reliability afforded by gravity feed. Moreover, regardless of wide variations in the speed of the gearing and the level of lubricant in the sump, an essentially constant flow of lubricant is supplied to the selected locations regardless of the direction of rotation. The system provides for storage of a quantity of lubricant near the top of the gear unit which is supplied with lubricant by splash (or when required actual removal) of lubricant from the ring gear and the lubricant so stored is fed at a relatively constant rate to various locations, such as bearings and meshing points of the gears.

It will be apparent to those skilled in the art that the illustrated embodiment of the invention is an example only and that many changes and modifications may be made without departing from the invention.

What I claim as new and desire to secure by Letters Patent of the United States is:

1. A lubrication system for a vehicular axle gear drive unit operable at high speeds wherein a main gear rotatably mounted within a gear housing having a lubricant retaining sump is adapted to supply lubricant to a lubricant storage reservoir secured to said housing and having outlet means for directing lubricant to preselected locations in the unit below the level of lubricant in the reservoir from which locations the lubricant is returned to the sump, comprising:
   (a) the lubricant storage reservoir being fitted about the upper portion of said main gear so as to extend outwardly of said main gear in a plane transverse to the longitudinal axis of the main gear.
   (b) first and second internal wall portions of said reservoir being arranged adjacent to the periphery of the main gear on opposite sides of the vertical center line of the main gear.
   (c) first and second lubricant deflecting means associated respectively with said first and second wall portions, said lubricant deflecting means extending from said reservoir toward the periphery of said main gear and spaced from each other on opposite sides of the vertical center line of the main gear for direciting lubricant carried from said sump by said main gear into the reservoir so as to maintain therein a considerable level of lubricant,
   (d) each of said lubricant deflecting means being positioned and shaped to admit lubricant into said reservoir during rotation of said main gear in either direction of rotation and comprising:
      (1) an arcuate first portion having one end terminating near the periphery of said gear and another end communicating with said reservoir, said arcuate first portion being positioned to deflect into said reservoir lubricant lifted and thrown off said main gear during rotation of said main gear in one direction, whereby lubricant is deflected into said reservoir by the first arcuate portion, respectively, of said first deflecting means during rotation in one direction and of said second deflecting means during rotation in the other direction;
      (2) a second portion to direct lubricant thrown from the top of the main gear directly into said reservoir during rotation of said main gear in the other direction, whereby lubricant is simultaneously admitted to said reservoir by the arcuate first portion of one of said deflecting means and by the second portion of another of said deflecting means.

2. The lubrication system of claim 1 wherein said main gear cooperates with said sump and reservoir whereby the amount of fluid supplied by said main gear into said reservoir varies as an inverse function of the level of lubricant in said reservoir so as to maintain a substantially constant fluid level therein.

3. In a vehicular gear unit wherein a pinion gear meshing with said main gear is drivingly secured to a shaft mounted on bearings disposed in the housing, the lubrication system of claim 2 wherein said reservoir has outlet means adapted to direct lubricant to said bearings and to the meshing portions of said pinion gear and main gear.

4. The lubrication system of claim 3 wherein said second portion of said lubricant deflecting means comprises a member secured to said arcuate first portion and extending substantially horizontally toward the periphery of said main gear.

5. The lubrication system of claim 1 wherein said housing carries baffle means which extend circumferentially from below the operating level of the lubricant in said sump in directions both clockwise and counter-clockwise and terminate above the operating level of the lubricant to form a channel which surrounds the lower portion of said main gear, said baffle means including a passage extending laterally therethrough below the operating level of the lubricant to flow laterally from said sump to said channel and be deposited on the inside rim surface of said main gear.

6. The lubrication system of claim 4 wherein said housing carries baffle means which extend from below the operating level of the lubricant and terminate thereabove to form a channel which surrounds the lower portion of said main gear, said baffle means including a passage extending laterally therethrough below the operating level of the lubricant to all lubricant to flow laterally from said sump into said channel and deposit on the inside rim surface of said main gear.

References Cited

UNITED STATES PATENTS

| 1,220,810 | 3/1917 | Alquist. | |
| 2,449,227 | 9/1948 | Hobart | 184—13 |
| 2,492,267 | 12/1949 | Burrows et al. | 184—11 |
| 2,555,003 | 5/1951 | Rhoads | 184—11 |
| 3,162,269 | 12/1964 | Reed. | |
| 2,292,086 | 8/1942 | Pritchard | 184—11 |
| 2,308,513 | 1/1943 | Ioannilli | 184—11 |

FOREIGN PATENTS

| 374,701 | 6/1932 | Great Britain. |

OTHER REFERENCES 1,047,820, December 1958, German printed application, Aktiengesellschaft.

LAVERNE D. GEIGER, Primary Examiner

E. J. EARLS, Assistant Examiner

U.S. Cl. X.R.

184—11, 13